March 31, 1970 C. S. MILLER ET AL 3,503,689

MICRODENSITOMETER

Filed Oct. 18, 1965 4 Sheets-Sheet 1

CARLTON S. MILLER
FREDERICK G PARSONS
INVENTORS by Alfred H. Rosen
Thomas N. Tenant
ATTORNEYS INVENTORS
CARLTON S. MILLER
FREDERICK G. PARSONS
by, Alfred H. Rosen
Thomas N. Tarrant
ATTORNEYS

INVENTORS
CARLTON S. MILLER
FREDERICK G. PARSONS by, Alfred H. Rosen
Thomas N. Tanon
ATTORNEYS INVENTORS
CARLTON S. MILLER
FREDERICK G. PARSONS
by, Alfred H. Rosen
Thomas N. Tarrant
ATTORNEYS United States Patent Office 3,503,689

Patented Mar. 31, 1970

3,503,689

MICRODENSITOMETER

Carlton S. Miller, Bedford, Mass., and Frederick G. Parsons, Providence, R.I., assignors to Technical Operations, Incorporated, Burlington, Mass., a corporation of Delaware Continuation-in-part of application Ser. No. 372,239, June 3, 1964. This application Oct. 18, 1965, Ser. No. 497,421

Int. Cl. G01n *21/06, 21/22*

U.S. Cl. 356—203 16 Claims

ABSTRACT OF THE DISCLOSURE

This disclosure depicts apparatus for photo-detecting and recording in two dimensions incremental differences in a particular optical characteristic of an examined specimen including optical examining means for sequentially examining adjacent elemental regions of the specimen and print-out means responsive to a signal generated by the examining means for producing a quantized two-dimensional record indicative of the detected differences in said characteristic. The write-out means includes a plurality of pens containing different colored inks, each of which is capable of being actuated in one of a number of different marking modes, the apparatus having the capability of producing a number of different print-out codes equal to the product of the number of available pens and the number of available marking modes for each of the pens.

CROSS REFERENCE TO RELATED APPLICATION

This application is a continuation-in-part of application Ser. No. 372,239, filed June 3, 1964, now Patent No. 3,424,534.

While, for purposes of discussion and illustration, our invention will be described in terms of analyzing radiographs, it is to be understood that the invention has equal applicability in any other field wherein it is desired to scan and plot, in two dimensions, changes in density-transmission or brightness characteristics of transparencies or photographic records, for example, in the photographic analysis of X-ray and radiographic film, biological specimen slides or astronomical objects such as eclipses and the like.

A photographic image may be considered as a large number of space-resolved photometer records of the apparent surface radiance of objects within the camera view. The optical density at a given resolution element on a developed negative can then be related to the brightness of the imaged solid angle of object space by application of the laws that govern the chemical processing of photographic materials and the physical light gathering power of lenses.

An X-ray film records the image of the attenuation of an X-ray beam as it passes through an object. The X-ray transmission characterictic of the object under study, along a given ray direction, is presented as optical density at the corresponding point on the developed negative. This is analog information that can be interpreted by the radiographer in such terms as the quality and quantity of the materials of a weld, the presence of cracks and/or voids or the quality of bonded materials. In many situations, a flaw in the X-rayed part becomes apparent in the film even to a casually trained observer while in another film, there may be just a barest showing that is so marginal that even the expert radiographer is hard pressed to decide whether or not the part does in fact have an imperfection.

While the usual qualitative observation of radiographic film may quickly reveal most of the pertinent photogrammetric (size-related) features of the radiographed object, it does not make full use of the photometric (transmission related) information on the negative. The human brain, in spite of its remarkable function as a computer, does not permit the radiographer or other individual reading the film to recognize objects and discontinuities that have too low a contrast compared to their surroundings, nor does it register the film density quantitatively. This extra level of information is present on the negative and can be extracted by appropriate microdensitometric analysis. However in the past, this extraction procedure has been both tedious, expensive and inaccurate.

While the human eye-brain combination is capable of recognizing for example, an optical-density step of less than 0.02 unit at a sharp edge, it is well known that if this density change takes place over much more than one-tenth millimeter the eye will see only a vague continuum and, as a result, the eye's inability to distinguish small, low-contrast objects or to recognize slow density gradients makes it useless insofar as detailed analysis of radiographic film is concerned.

A microdensitometer has been defined as being "a device usually applied in photographic spectroscopy to detect, by light-transmission measurement, spectrum lines recorded on the negative which are too diffuse or faint to be seen by the eye." (Van Nostrand's Scientific Encyclopedia, third edition, January 1958.)

Conventional microdensitometers operate in the one-dimension mode, scanning along a single line of the sample, the presentation usually being a graph of optical-density (or transmission) versus displacement of the probing light beam. To map a two-dimensional pattern using this type of instrument, it is necessary to make a series of parallel scans and then construct contours by transferring equi-density points to their appropriate X and Y positions on a display. This procedure is usually a very time consuming one, especially if the investigator must convert photographic density to object brightness and then correct for vignetting by the camera lens at each data point. Although the operation may be automated by digitalizing the X and Y and density data so that a fully corrected contour map may be compiled with the aid of an electronic computer, it is obvious that the cost of such a computer installation will be excessively high and, as a result, will be out of reach of all but a very few laboratories.

To date, the only other two-dimensional presentation of photometric information known to us that has been made by adapting the microdensitometer to a successive scanning mode of operation appears in an article by O. C. Mohler and A. K. Pierce "A High Resolution Isophotometer," Astrophysics Journal, vol. 125 (1957), page 285. In the Mohler and Pierce device a negative is light-scanned in a given direction and a recording platen is caused to move in a corresponding direction. The scanning light beam is amplified and fed into a "Speedomax" recorder which has been set up to direct the phototube output corresponding to prescribed levels of density. Thereafter, as the density changes from one level to another, the recording pen is made to either print or raise off the paper to indicate that another density level has been reached. Since the pen either writes or does not write only when there is a relatively broad density change (whether the density increases or decreases) there is no information present on the isophote that tells the reader the direction of change. Similarly, since a single beam of light is being used, there can be no correction applied to the output which takes into consideration the relation between the exposure given to a light sensitive layer and the density of image obtained after development of the layer (the H & D curve first discussed by Hurter & Driffield i.e. the intensity-density transfer function of the light-sensitive layer). By the same token, it is known that when fast camera lenses having wide angles are used, there is a reduction in the incident light flux on the film at angles greater than about 10° from the optical axis. This phenomenon is called "vignetting." These off-angle ray bundles must be compensated to get the correct scene brightness. Without correcting for the H & D curves of the record film and if necessary, correcting for vignetting of the lens, the results may be erroneous and in certain instances could mask some otherwise important information on the film.

We have developed a simple, relatively inexpensive device based on the microdensitometer principle, that automatically generates two-dimensional plots of equal optical density. By so doing, we are able to show features present on X-ray films, as well as on conventional photographic records, that are not apparent in the usual qualitative determination. The recording device resolves objects of very low contrast, quantitatively showing the point-by-point X-ray transmission and the relation among neighbouring points while suppressing the normal graininess of the X-ray film. In a typical embodiment of our device, a microscope-densitometer scans the negative image with a beam of light and the density increments are printed on a table linked by a pantagraph to the film carrying stage. After writing a complete scan line the instrument stops, returns and advances to a new scan line. Solenoid activated pens, one for each of a plurality of colors, print out the density increments in a multiple-symbol multicolor code. Within the limits of a first optical density level a selected pen drops down and draws a segment of straight solid line along the paper on the write-out stage. Should the density increase, by some fixed increment to a second next higher level, the pen can be programmed to lift up and leave a blank for the length of time that the density remains within limits of the second level. Should the density increase to a next higher third level, the pen can be made to move up and down, drawing a series of dots on the paper on the write-out stage for the time interval that the density remains within the third level. Should the density thereafter successively increase to the next higher fourth, fifth and sixth levels, respectively, the pen could be programmed to successively write a solid line for the fourth level, a blank at the fifth level and a series of dots at the sixth level, the write-out being done in all density levels for the length of time that the density remains within the predetermined levels. Thus, for a constantly increasing density situation, a typical symbol cycle would be dash-blank-dot; dash-blank-dot; etc. while for a scan involving a density decrease, the corresponding symbol cycle would be dash-dot-blank; dash-dot-blank; etc. The symbol cycle is expanded by switching successively to pens of different color ink. It should now be readily apparent that an increasing density situation may be easily distinguished from a decreasing density situation in a single scan. In a series of scan traces wherein increments of transparency or other photographic records are scanned, the result is a plot of density information in two dimensions.

Since the successive density increments can be fixed at virtually any value, by choosing small density increments it has been found that the density range of the negative has been spread out giving excellent contrast enhancement.

Thus it is the object of the present invention to define a microdensitometer capable of producing density in two dimensions using symbol codes, color codes, and combinations of both.

It is a further object of the invention to define means for programming codes, for contour plotting as applied to density variations in photography, elevation variations in cartography, and all forms of distributed variables that are chartable in maplike form such as, for example, pressure distribution in weather mapping.

It is still a further object of the invention to define means for recording symbol and color codes in two dimensions.

The features of our invention which we believe to be novel are set forth with particularity in the appended claims. Our invention itself, however, both as to its organization and method of operation, together with further objects and advantages thereof, may best be understood by reference to the following description taken in conjunction with the accompanying drawings, in which:

Figure 1:
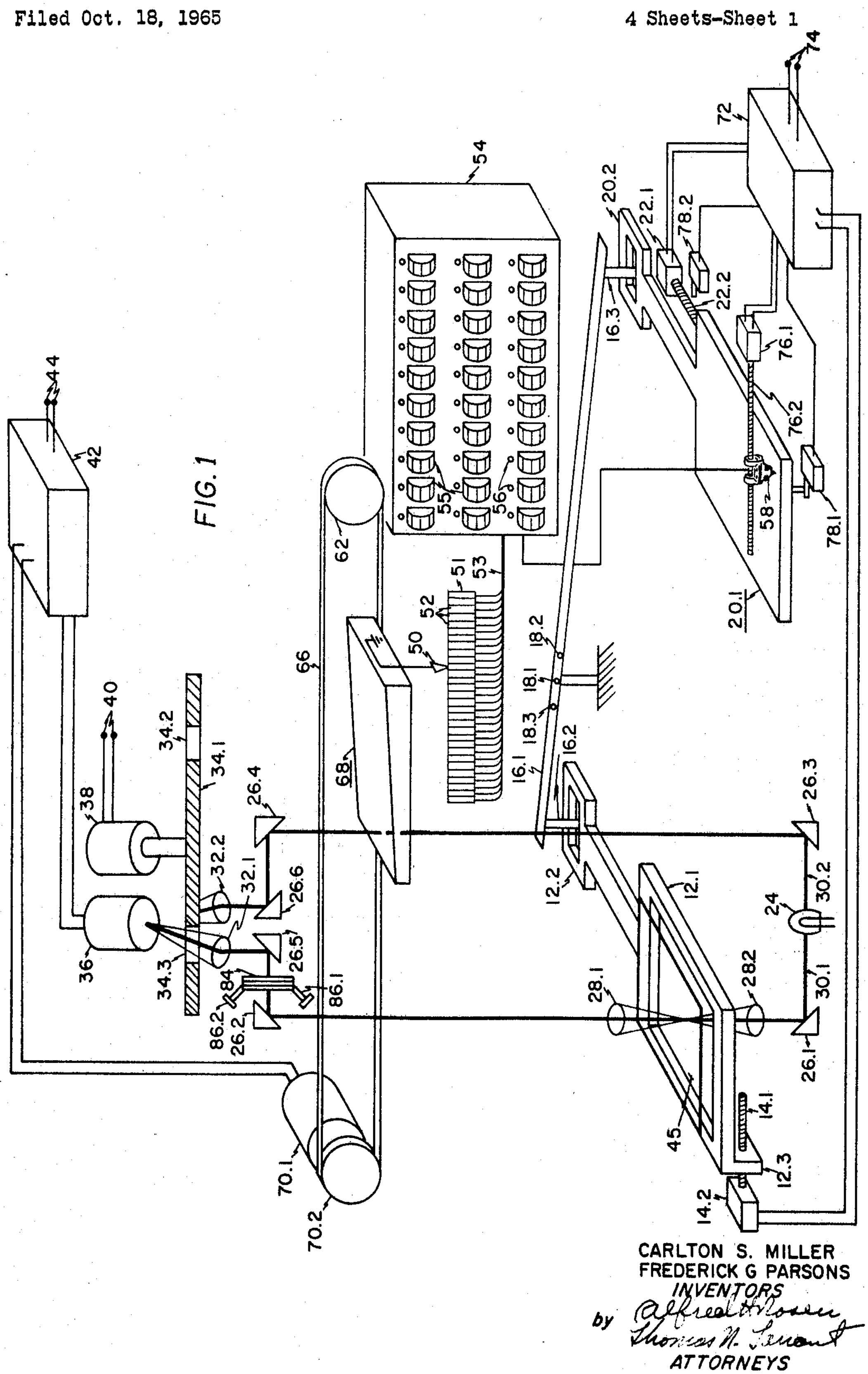
FIG. 1 is a partial schematic and block diagram representation embodying the principles of our invention.

Referring now to FIG. 1 there is shown microscope type optics consisting of lenses 28.1 and 28.2 for scanning a recorded image (not shown) which may be located in the aperture of record holder 12.1.

As has been previohsly mentioned, it is sometimes desirable to correct for "vignetting" of the lens system. This can be done in a number of ways, but is has been found convenient to use a mask 45 positioned over the recorded image in record holder 12.1 of FIG. 1. This mask is selected with transmission gradations to compensate for image density error due to "vignetting." The scanning of the recorded image in, for example, the X direction is accomplished by means of motor 22.1 which drives lead screw 22.2. Lead screw 22.2 is appropriately mated with write-out or recording platen 20.1 so that rotation of lead screw 22.2 causes recording platen 20.1 to move in one direction. For the sake of illustration, it will be assumed that platen 20.1 is movable up and down, that is, from the top of the page to the bottom, the length of movement being determined by limit switches 78.1 and 78.2 which serve to deenergize motor 22.1 when recording platen 20.1 reaches a prescribed distance in one direction or the other. The record holder 12.1 is linked to the write-out platen 20.1 by means of the pantagraph arm 16.1 having pins 16.2 and 16.3 located at the ends thereof. Pin 16.3 fits into the aperture of the extension 20.2 of recording platen 20.1 while pin 16.2 fits into the aperture of the extension 12.2 of the record holder 12.1. The pantagraph arm 16.1 is shown as pivoting about point 18.1, however a greater or lesser magnification of the record made on platen 20.1 is possible by relocating the pivot point to apertures 18.2 or 18.3, for example.

Thus, as recording platen 20.1 is caused to move in one direction (the X direction) record holder 12.1 will also move in a corresponding direction at a reduced ratio depending upon which of the apertures (18.1, 18.2, or 18.3) is the pivot point about which the pantagraph arm rotates.

Scanning of the record holder 12.1 in the Y direction (left and right) is accomplished by means of step motor 14.2 and lead screw 14.1, which lead screw is threaded and mates in the extension 12.3 of record holder 12.1. Simultaneous with the movement imparted by motor 14.2, step motor 76.1 drives lead screw 76.2 to set the position in the Y direction of the writing pen assembly 58 relative to the recording platen 20.1. Appropriate leads couple both motors (14.2 and 76.1) to the position sensing portion of box 72 which derives its operating potential by means of terminals 74. The position sensing mechanism (not shown) provides another source of magnification in the other (i.e. the Y) direction. That is, motors 14.2 and 76.1 do not necessarily have to advance holder 12.1 and platen 20.1 the same distance but instead, if for example motor 76.1 advances pen assembly 58 one distance greater than the distance that motor 14.2 is advanced record holder 12.1, a magnification will be achieved of the record made on the platen 20.1 relative to the image being scanned on record holder 12.1, in the Y direction.

Having now provided the relative motions in the X and Y directions for both the record holder and the recording platen, there is further provided the scanning light source system. The light is generated from source 24 and proceeds along beam paths 30.1 and 30.2. Scanning beam 30.1 is reflected off a surface of mirror 26.1, passing through lens 28.2, through the record being scanned and thence through lens 28.1. Thereafter, it proceeds to mirror 26.2 where it is again reflected to pass through an exit slit 84, the dimensions and position of which may be altered by screws 86.1 and 86.2. Exit slit 84 sets the exact dimensions of the scanning beam 30.1 at this point in the beam path. After passing through exit slit 84, scanning beam 30.1 is then reflected off of mirror 26.5 whereupon it is collected and focused by lens system 32.1 on photomultiplier 36. Simultaneous with the forming of beam 30.1, beam 30.2 is formed and directed by reflection from mirror 26.3 and up through the optical density transmission, here shown as wedge 68. While the wedge has been here illustrated as a wedge having a physical dimension which changes along its length, it should be understood that this is representative of a light wedge with continuously varying shades of gray and is comparable to a photographic gray scale. The operation of wedge 68, with respect to the overall system, will be described in detail hereinafter.

Having passed through wedge 68, beam 30.2 is then reflected off mirror 26.4 and mirror 26.6 to be collected and focused by lens system 32.2 on photomultiplier 36.

Motor 38, driven by a source of 60 cycle power applied to terminals 40, is a synchronous motor driving disc 34.1 having apertures 34.2 and 34.3 located therein. The positions of apertures 34.2 and 34.3 are arranged so that each aperture will pass only one light beam. Since the motor 38 is synchronous, the pulse rate of each beam will be about 60 cycles. Thus, as the disc 34.1 rotates light beams 30.1 and 30.2 are alternatively allowed to fall on photomultiplier 36 which photomultiplier is shown having the usual dynodes therein. By providing this 60 cycle chopping action, the intensity of the beams 30.1 and 30.2 may be compared in a comparator portion of box 42 which box derives its power from a source connected to terminals 44. If the intensity of one beam is greater than the intensity of the other, an appropriate signal is fed from box 42 to servo-motor 70.1 which rotates the sheave 70.2 in an appropriate direction. Thus, if for example, beam 30.1 (the scanning beam passing through the recorded image) has a greater intensity then the beam passing through wedge 68, the signal being fed to servo-motor 70.1 is such that sheave 70.2 is rotated in a counterclockwise direction causing beam 30.2 to pass through a less dense portion of wedge 68. This shifting of wedge 68 will continue until beams 30.1 and 30.2 have equal intensities presented to photomultiplier 36 for each section of the record being scanned.

Wedge 68 carried a sliding switch contact 50 which moves with wedge 68 so that it contacts one of a plurality of switch segments in segmented switch bar 51. Thus as wedge 68 moves back and forth switch contact 50 will make an electrical contact to different ones of switch segments 52. Each of switch segments 52 connected by means of a cable 53 to record programming apparatus represented by a block 54. The record programming apparatus includes a plurality of switches 55, one for each of the segments in switch bar 51. Small panel lamps 56 adjacent to each of switches 55 indicate which switch is connected to the segment contacted by switch contact 50. Programmer 54 is electrically connected by means of cable 57 to a recording pen assembly 58 for controlling the operating mode of pen assembly 58.

In some embodiments it might be preferable to have the gray scale gradations of wedge 68 correspond to the H & D curve. However, in accordance with the present invention a linear wedge 68 can be used and the H & D curve or any other curve may be programmed into the printout by means of switch settings in programmer 54. Electrical operation of this system will be better understood by referring to FIGS. 2 and 3.

Figure 2:
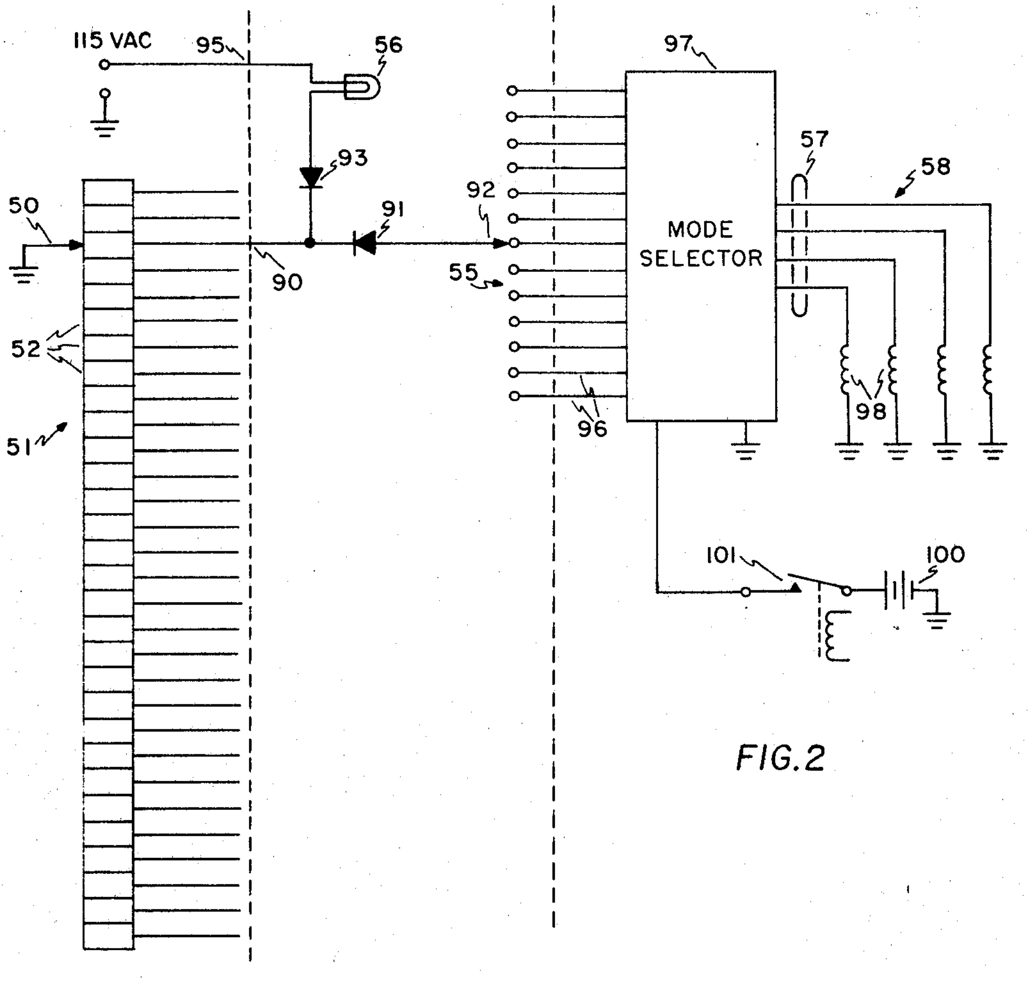
FIG. 2 is a partial schematic and block diagram showing means for programming and operating recording pens in accordance with the invention.

In FIG. 2 switch bar 51 is depicted with switch contact 50 grounding one of segments 52. The grounded segment is connected to wire 90 which in turn is connected through a diode 91 to a switchable contact 92 in one of switches 55. It will be understood that wire 90 is one of the leads in cable 53 of FIG. 1. A second diode 93 connects lead 90 to one of the panel lamps 56 which is connected in common with the rest of panel lamps 56 at a terminal point 95 to a 115° volt AC line. Diodes 91 and 93 serve the purpose of blocking the 115 volts AC from the DC circuits. The circuit portion comprising the elements 55, 56, 91, 92, and 93 and the leads interconnecting these elements are repeated for each of the segments 52 and switch bar 51. Thus where the switch bar 51 has 30 segments as illustrated there will be 30 panel lamps 56 connected to terminal point 95 of the 115 volt line. Likewise, 30 switches 55 will be connected with their output leads in parallel to leads 96 connected to mode selector 97.

An embodiment of mode selector 97 will be described in detail with reference to FIG. 3. Mode selector 97 has an output cable 57 connected to recording pen assembly 58. The leads in cable 57 are connected to solenoid devices 98, one for each pen in the pen assembly 58. The pen assembly will be described further with reference to FIG. 4. Power for operating solenoids 98 is connected to mode selector 97 from a DC source depicted by battery 100. A relay 101 serves to disconnect DC source 100 during retrace time in the recording process. Relay 101 is operated responsive to microswitches 78.1 and 78.2.

Figure 3:
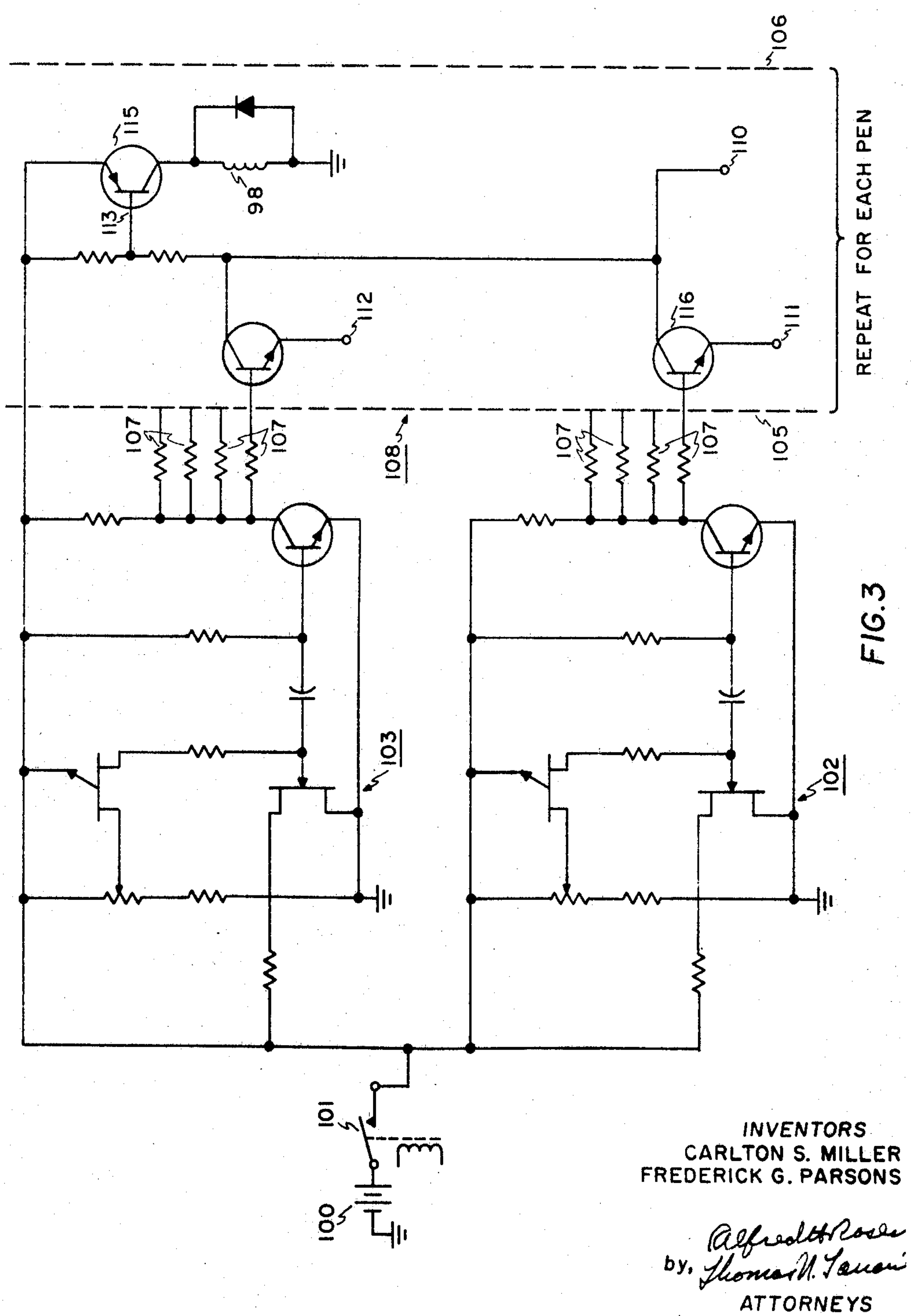
FIG. 3 is a schematic illustration of the block in FIG. 2.

FIG. 3 is a schematic illustration of circuitry suitable for operating the recording pens in pen assembly 58. Since this circuitry is for the most part conventional it will not be described in detail. In the embodiment illustrated it includes two pulse generators. A first pulse generator circuit 102 includes RC components for operation at a predetermined repetition rate. Second pulse generator 103 contains RC components to provide a pulse repetition rate slower than that of pulse generator 102. These pulse generators are powered from DC source 100 and are disabled during retrace time by relay 101. Pulse generators 102 and 103 are connected to a circuit for operation of one of the recording pen solenoids 98. This circuit separated by dashed lines 105 and 106 is repeated in parallel for each recording pen. While there is no necessary limitation on the number of pens, for simplicity the present invention will be described utilizing four pens. Thus it will be noted that there are four resistors 107 connected to the output of each of pulse generators 102 and 103. One of these resistors from each of pulse generators 102 and 103 is illustrated as connected to the circuit for driving one of pen solenoids 98. The remaining resistors will be understood to be connected to other identical circuits for driving three other pen solenoids 98.

There are three terminals 110, 111, and 112 for connecting a switch signal into pen driving circuit 108. Referring to FIGS. 1 and 2 it will be seen that the switch signal is a connection to ground at wedge 68 through contact 50, one of segments 52, lead 90 and one of switches 55. When terminal 110 is grounded, base electrode 113 of transistor 115 will go negative biasing the transistor into conduction so that current flows through one of solenoids 98. Current flowing in one of solenoids 98 will bring one of the recording pens into operation producing a continuous line. When terminal 111 is grounded, transistor 116 will conduct whenever pulse generator 102 biases the base electrode positive. Conduction of transistor 116 will bias transistor 115 into conduction. Conduction of transistors 116 and 115 will thus occur repeatedly at the pulse rate of pulse generator 102. This pulsing of one of solenoids 98 will bring one of the recording pens into operation during each pulse producing dashes at the pulse repetition rate. Similar action will occur when terminal 112 is grounded, but at the pulse repetition rate of generator 103. Since each of circuits 108 has three operational connection terminals and there are four of these circuits in the four pen embodiments described, the total number of terminals is twelve. This is represented by the twelve leads 96 in FIG. 2 connecting mode selector 97 to one of switches 55. Switches 55 each have a thirteenth position left unconnected for providing the "space" mode of operation. This arrangement permits any one of the four pens to be selected for operation in any one of the modes: line, fast dot, or slow dot.

Figure 4:
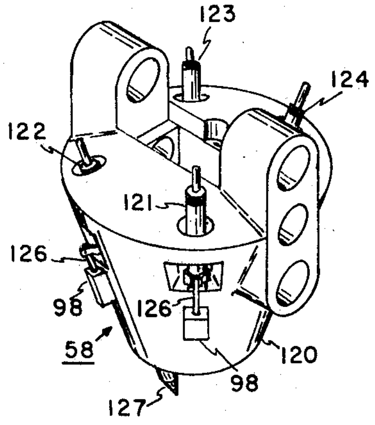
FIG. 4 is a simplified illustration of an embodiment of a recording pen assembly in accordance with the invention.

FIG. 4 shows an embodiment of pen assembly 58. This assembly comprises body member 120 containing four pens 121, 122, 123, and 124. Conventional ball point pens have been found operative in the invention. The pens are slidably mounted in body member 120 so that they may be lowered into an operating position or raised into a non-operating position. Solenoids 98 are operatively connected to each of pens 121–124 by means of arms 126 for raising and lowering. As illustrated in FIG. 4, pen 124 is depicted as lowered in the operating position so that its point 127 will contact recording paper. Recording pens 121 to 124 each have different colors of ink for example pen 121 can be red, pen 122, green, pen 123, blue, and pen 124, black.

In review, the electrical signal system begins with sliding ground contact 50 on wedge 68. Contact 50 grounds one of thirty segments 52 depending on the wedge position. Thirty wires leave the thirty segments each wire connecting first to a panel lamp. The panel lamp connected to the grounded segment lights. Each of the thirty wires is connected secondly to a wiper switch contact 92 on a respective one of thirty switches 55. Each of the thirty switches 55 has a single wiper contact 92 and thirteen secondary contacts. Of the thirteen secondary contacts one in each switch is unconnected. Each one of the remaining twelve contacts is connected in parallel with the respective contact from each of the remaining switches to a single one of twelve leads 96 connected to mode selector 97. Mode selector 97 has four output circuits, each one operatively connected to one of four solenoids for activating one of four pens.

It will be seen that this programmer arrangement allows selection of any of thirteen codes for any or all of the segments in switch bar 51. Thus, for example, connection for the H & D curve can be programmed into switch bar 51 by setting switches 55 so that certain adjacent groups of segments 52 will operate with the same recording code.

Figure 5:
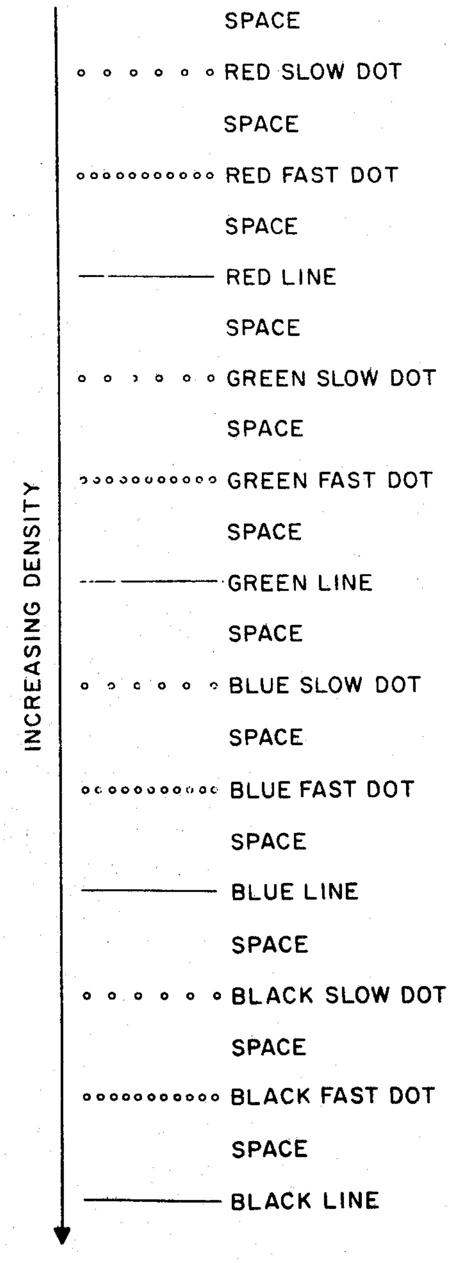
FIG. 5 is a graphical representation of a coding arrangement that can be used to record density variations in accordance with the invention.

FIG. 5 illustrates a sequence of codes that could be used to represent increasing density. It will be recognized that this is only one of numerous code sequences that can be programmed.

FIG. 5 illustrates a very simple straightforward sequence of coding. The programming flexibility of the present invention permits each successive sequence of discrete codes to contain a variance from the previous sequence so that a person analyzing the completed plot can readily tell which sequence level he is looking at. For example, a sequence following the sequence in FIG. 5 with still further increasing density could be space-red slow dot-space-green fast dot-space-blue line-space-black slow dot-space-red fast dot-etc. with each color changing with each successive symbol code. Thus a very large number of sequences can be programmed with each successive sequence containing some factor of variance with any of the preceding sequences. Also it is possible with the invention to establish a number of differing standard code sequences one to be used with each of a number of different applications for which the invention might be used.

While the invention has been described using thirty switch bar segments, two dot speeds and four pens, these numbers have no criticality. One embodiment of the invention has been made using 64 segments in switch bar 51. The number of pens can readily be increased to eight or more.

While the invention has been described in relation to specific embodiments for densitometry, certain aspects of it are equally applicable to apparatus in the fields of cartography, oceanography, meteorology, etc. Thus with appropriate means to provide a moving contact to switch bar 51 representative of altitude, depth, population, pressure, humidity, etc., it is possible with the present invention to provide a two dimensional coded chart showing a third dimension of information by combinations of symbol and color codes.

We claim:

1. A densitometer comprising:

(a) means to provide a first light beam;

(b) means to provide a second light substantially identical to said first light beam;

(c) scanning means to scan a photographic transparency with said first light beam;

(d) comparison means for comparing the intensity of said first beam after passing through said transparency with said second beam;

(e) a gray scale wedge interposed in the path of said second beam;

(f) motive means including feedback means to said comparison means for moving said gray scale wedge until the intensities of said first beam and said second beam match;

(g) recording means comprising plural pens;

(h) transport means coupled to said scanning means to move said recording means across a recording surface in correspondence with said scan of said transparency;

(i) pen-actuating means to reciprocate a selected one of said pens in a predetermined mode of marking operation on said surface in response to energization by input signals thereto;

(j) means responsive to the position of said wedge for generating said input signals and supplying said signals to said pen-actuating means for determining the selection of a pen and its mode of marking operation so that a two dimensional density plot is coded on said surface by the movement and operational modes of said plural pens.

2. A densitometer according to claim 1 in which said recording means comprises plural pens each carrying different color ink and electrical means for positioning any selected one of said plural pens into position for producing a mark on said recording surface.

3. A densitometer according to claim 2 in which said electrical means comprises a plurality of solenoid devices one for each of said pens and operable each to move its respective pen in and out of writing position at a rate to produce regularly spaced dots.

4. A densitometer according to claim 1 in which said means to actuate comprises pulse generator means and pen reciprocating means for each pen responsive to said pulse generator means for operating any selected one of said pens at a dot rate determined by the pulse rate of the said generator.

5. A densitometer according to claim 4 in which said means to actuate comprises a plurality of said pulse generators each for a different pulse rate.

6. A densitometer according to claim 1 in which said means of selecting one of said pens and its mode of operation comprises a segmented switch bar, electrical contact means coupled to said wedge and engaging said switch bar for completing an electrical circuit through a segment of said switch bar determined by the position of said wedge, an encoder in each of said electrical circuits including means for selectively actuating each of said pens in each of a plurality of write-out modes in response to energization of one of a predetermined number of input terminals representing the product of the number of available write-out modes and the number of available pens, and a multiple position switch in each of said electrical circuits interconnecting a switch segment with a selected one of said input terminals on an associated encoder.

7. A programmable recorder for two dimensional plots of information having three dimensions comprising:

(a) a recording pen assembly including a plurality of pens and actuating means for reciprocating said pens in accordance with input signals thereto, and means to move said recording pen assembly in X and Y directions in accordance with two dimensions of input information;

(b) means to feed a third dimension of input information into a segmented switch bar so that the value of the third dimension information determines the segment selected;

(c) a plurality of multiple position switches and means for connecting each switch to at lest one segment of said switch bar;

(d) a mode selector circuit for generating input signals for transmission to said actuating means in said recording pen assembly to cause a selected one of said pens to operate in a selected one of a plurality of modes for providing a number of print-out codes corresponding to the product of the number of available write-out modes for each pen and the number of available pens; and (e) connection means between said multiple position switches and said mode selector circuit for enabling selection of any one of said plurality of print-out codes by the position of the switch.

8. A programmable recorder according to claim 7 in which said third dimension of input information is photographic density in a photographic transparency and said means to feed into a segmented switch bar is a gray scale wedge carrying an electical switch contact which is moved by a servo system to balance light intensity in one path with light intensity varied by a photographic image in a second path.

9. A programmable recorder according to claim 7 in which said plurality of multiple position switches contain positions for selecting the mode of operation of said recording pen assembly to be representative of the respective segment of the said switch bar and said positions in each of said switches including a position for each mode available in said mode selector circuit.

10. A programmable recorder according to claim 9 in which said recording pen assembly comprises a plurality of pens each containing a distinctive color ink and each operable in a plurality of symbol codes so that the total number of discrete codes available is the number of pens multiplied by the number of symbol codes.

11. A programmable recorder according to claim 10 in which said mode selector circuit comprises a plurality of pulse generators each having a different repetition rate and said recording pen assembly includes a solenoid device for moving each of said pens in and out of printing position whereby one of said pulse generators is connected to one of said solenoid devices and the pen associated with the one of said solenoid devices produces dots at the repetition rate of said pulse generator.

12. A programmable recorder according to claim 10 in which the number of segments in said switch bar is at least twice the total number of discrete codes available; and said multiple position switches are programmable so that a repeated sequence of the total number of discrete codes can contain a variance with respect to at least one preceding sequence.

13. For operation in response to a signal derived by optical examining means having cooperating light source and photodetection means for sequentially examining elemental regions of a scanned specimen to detect differences in an optical characteristic of the specimen, recording apparatus comprising:

write-out means for producing on a recording material a quantized two-dimensional record indicative of differences in said optical characteristic, said write-out means including a plurality of distinct marking means each being capable of actuation in a plurality of distinct write-out modes to provide a number of print-out codes related to the product of the number of available write-out modes and the number of available marking means;

motive means for effecting relative movement between said write-out means and the recording material to effectively cause said write-out means to scan the recording material;

means for effectively synchronizing the write-out produced by said write-out means with the input signal information;

said write-out means including control means responsive to said input signal for changing the output of said write-out means from one of said print-out codes to another of said codes in accordance with a detected difference in said optical characteristic which exceeds a predetermined level, the sequence of said code changes indicating a particular direction of change of said characteristic.

14. The apparatus defined by claim 13 wherein said marking means comprises a plurality of pens containing ink of different colors.

15. Apparatus for measuring and for producing two-dimensional records of incremental differences in a particular optical characteristic of an examined specimen, comprising:

optical examining means for sequentially examining adjacent elemental regions of the specimen to detect differences in said characteristic, said examining means including a light source and photodetection means for producing an output characterizing the detected differences in said optical characteristic;

first motive means for effecting relative movement between said optical examining means and the specimen;

write-out means for producing on a recording material a quantized two-dimensional record indicative of said differences in said optical characteristic, said write-out means including a plurality of distinct marking means each being capable of actuation in a plurality of distinct write-out modes to provide a number of print-out codes related to the product of the number of available write-out modes and the number of available marking means;

second motive means for effecting relative movement between said write-out means and the recording material;

means for correlating said first and second motive means to produce an effective correlated scan of the specimen by said optical examining means and of the recording material by said write-out means; and control means responsive to said output from said optical examining means for changing the output of said write-out means from one of said print-out codes to another of said codes in accordance with a detected difference in said optical characteristic which exceeds said predetermined level, the sequence of said code changes indicating a particular direction of change of said characteristic.

16. The apparatus as defined by claim 13 wherein said write-out means comprises a plurality of pens each containing a different color ink and each being actuated by an associated solenoid, and wherein said control means comprises:

switching means including sliding contact means driven in accordance with said input signal across a plurality of discrete mating contacts;

circuit means for developing a plurality of signals having distinct waveforms effective when applied to said solenoids to cause said pens to be actuated in said plurality of distinct write-out modes; and means for connecting said discrete mating contacts and said solenoids through said circuit means such that as said input signal varies, said write-out means effects a sequential selection in accordance with a predetermined program of different combinations of said pens and associated write-out modes.

References Cited

UNITED STATES PATENTS

| | | | |
|---|---|---|---|
| 2,582,073 | 1/1952 | Scudder | 346—33 |
| 2,936,207 | 5/1960 | Beaumont et al. | 346—29 |
| 3,270,348 | 8/1966 | Lesage et al. | 346—33 |

JOSEPH W. HARTARY, Primary Examiner

U.S. Cl. X.R.

346—33, 46; 356—205